US009973615B2

(12) United States Patent
Jang et al.

(10) Patent No.: US 9,973,615 B2
(45) Date of Patent: May 15, 2018

(54) ELECTRONIC APPARATUS AND METHOD FOR CONTROLLING RECORDING THEREOF

(71) Applicant: SAMSUNG ELECTRONICS CO., LTD., Suwon-si (KR)

(72) Inventors: Ji-hoon Jang, Suwon-si (KR); Du-seok Kim, Yongin-si (KR); Hyun-cheol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 15/150,829

(22) Filed: May 10, 2016

(65) Prior Publication Data

US 2016/0337507 A1 Nov. 17, 2016

Related U.S. Application Data

(60) Provisional application No. 62/159,538, filed on May 11, 2015.

(30) Foreign Application Priority Data

Jul. 31, 2015 (KR) ........................ 10-2015-0109079

(51) Int. Cl.
| | |
|---|---|
| *H04M 3/00* | (2006.01) |
| *H04W 24/00* | (2009.01) |
| *H04M 1/725* | (2006.01) |
| *H04W 4/02* | (2018.01) |
| *H04M 3/533* | (2006.01) |

(52) U.S. Cl.
CPC ... *H04M 1/72569* (2013.01); *H04M 3/53341* (2013.01); *H04W 4/02* (2013.01); *H04M 2250/12* (2013.01)

(58) Field of Classification Search
None
See application file for complete search history.

(56) References Cited

U.S. PATENT DOCUMENTS

| | | | |
|---|---|---|---|
| 9,185,062 B1 * | 11/2015 | Yang | H04L 51/046 |
| 2009/0164219 A1 * | 6/2009 | Yeung | G04C 3/002 |
| | | | 704/258 |
| 2010/0245583 A1 * | 9/2010 | Harel | G08B 13/19656 |
| | | | 348/159 |
| 2012/0142324 A1 | 7/2012 | Kim et al. | |
| 2013/0317944 A1 * | 11/2013 | Huang | G01S 5/0252 |
| | | | 705/26.61 |

FOREIGN PATENT DOCUMENTS

KR 10-1220156 B1 1/2013

* cited by examiner

*Primary Examiner* — Erika Washington
(74) *Attorney, Agent, or Firm* — Sughrue Mion, PLLC

(57) ABSTRACT

An electronic apparatus according to an exemplary embodiment includes a sensor, a communicator configured to receive a wireless signal, a microphone configured to convert a sound to an electrical signal, and a processor configured to determine a movement of the electronic apparatus based on the signal, determine a location of the electronic apparatus based on a source of the wireless signal, and control a recording operation through the microphone based on the determined location of the electronic apparatus and the status of the electronic apparatus.

20 Claims, 13 Drawing Sheets

ELECTRONIC APPARATUS AND METHOD FOR CONTROLLING RECORDING THEREOF

CROSS-REFERENCE TO RELATED APPLICATIONS

This application claims priority from Korean Patent Application No. 10-2015-0109079, filed in the Korean Intellectual Property Office on Jul. 31, 2015, and the benefit of U.S. Provisional Patent Application No. 62/159,538, filed in the United States Patent and Trademark Office on May 11, 2015, the disclosures of which are incorporated herein by reference in their entireties.

BACKGROUND

1. Field

Methods and apparatuses consistent with exemplary embodiments relate to an electronic apparatus and a method for controlling recording thereof, and more particularly, to an electronic apparatus which detects that a meeting takes place using a sensor, a microphone and wireless signal information and automatically provides a recording operation in accordance with the meeting and a method for controlling recording thereof.

2. Description of Related Art

Recently, with the development of technologies, an electronic apparatus, such as a smart phone, includes various sensors, and the technology of measuring a user's behavior using these sensors, detecting a user's circumstances, and automatically providing an appropriate service has been developed.

A related electronic apparatus may automatically detect a user's meeting situation and turn on or off the functions of the electronic apparatus in accordance with the meeting situation. Meanwhile, in order for an electronic apparatus to automatically detect a meeting situation, the electronic apparatus may receive a signal from a pressure sensor attached to a chair in a specific meeting place and determine whether there are people who are actually attending the meeting.

SUMMARY

According to an aspect of an exemplary embodiment, there is provided an electronic apparatus, including: a sensor; a communicator configured to receive a wireless signal; a microphone configured to convert a sound to an electrical signal; and a processor configured to determine a movement of the electronic apparatus based on a signal output from the sensor, determine a location of the electronic apparatus based on a source of the wireless signal, and control a recording operation of enabling the microphone based on the determined location of the electronic apparatus and the movement of the electronic apparatus.

The location of the electric apparatus may be determined based on an intensity of the wireless signal.

The processor may be further configured to control the recording operation to intermittently record.

The processor may be further configured to control the recording operation for a first time period, process the recorded voice data for a second time period, and stop recording for a third time period.

The processor may be further configured to generate recorded voice data based on the electrical signal, determine a number of speakers based on the recorded voice data, and in response to the number of speakers being greater than n (n is a natural number), set the electronic apparatus to a meeting mode.

The processor may be further configured to, in response to the determined number of speakers being smaller than n (n is a natural number), pause the recording operation for a predetermined time, and resume the recording operation again after the predetermined time elapses.

The electronic apparatus may further include: a display configured to display a screen, and the processor may be further configured to control the display to display a UI screen indicating the meeting mode.

The meeting mode may be a vibration mode.

The meeting mode may be a silent mode.

The processor may be further configured to, in response to receiving a call from a caller while operating in the meeting mode, control the communicator to transmit a preset message to the caller.

The processor may be further configured to generate a plurality of sub frames by dividing the recorded voice data by a predetermined time interval, extract a plurality of feature values from a sub frame of the plurality of sub frames, and calculate an average and a standard deviation of the plurality of feature values to determine the number of speakers.

The processor may be further configured to generate the intensity information of the wireless signal based on average values of the wireless signal over a period of time.

The processor may be further configured to generate the intensity information of the wireless signal based on a standard deviation of the average values.

The processor may be further configured to determine the location of the electronic apparatus based on log data of an application program executed by the electronic apparatus.

The processor may be further configured to stop the recording operation when the electronic apparatus is at a first location.

The processor may be further configured to control the recording operation based on time of day information and date information.

The time of day information and date information may correspond to a meeting appointment time.

According to an aspect of another exemplary embodiment, there is provided a method for controlling recording of an electronic apparatus including a sensor configured to sense a movement of the electronic apparatus and a communicator, the method including: determining a movement of an electronic apparatus based on a signal output from the sensor; determining a location of the electronic apparatus based on at least one among a source of a wireless signal received by the communicator; and controlling a recording operation of the electronic apparatus based on the determined location of the electronic apparatus and the movement of the electronic apparatus.

The method may further include: recording a voice input through a microphone for a first time period; processing the recorded voice data for a second time period; determining the number of speakers based on the voice data; determining whether the number of speakers is greater than n (n is a natural number); and in response to the number of speakers being greater than n, setting the electronic apparatus to a meeting mode.

The method may further include, in response to the number of speakers being smaller than n, pausing recording for a third time period.

The method may further include: stopping the recording operation in response to the determining the location of the electronic apparatus as a first location.

According to an aspect of yet another exemplary embodiment, there is provided an electronic apparatus including: a plurality of sensors configured to generate a plurality of sense signals; a communicator configured to communicate with a plurality of external devices and generate a communication signal; a microphone configured to generate an electrical signal corresponding to a sound; and a processor configured to determine a location of the electronic apparatus based on the plurality of sense signals and the communication signal, intermittently record the electrical signal based on the determined location, determine whether the user is in a meeting based on the recorded electrical signal, and in response to determining the user is in the meeting, set the electronic apparatus to a meeting mode.

The processor may be further configured to determine whether there is a meeting based on a number of speakers determined based on the electrical signal.

The processor may be further configured to perform the intermittent recording while in the location.

A sensor of the plurality of sensors may be a motion sensor, and the processor may be further configured to determine whether the electronic apparatus is in a steady state based on the motion sensor, and the processor may be further configured to perform the intermittent recording is in response to a motion signal generated by the motion sensor being less than a threshold motion value.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
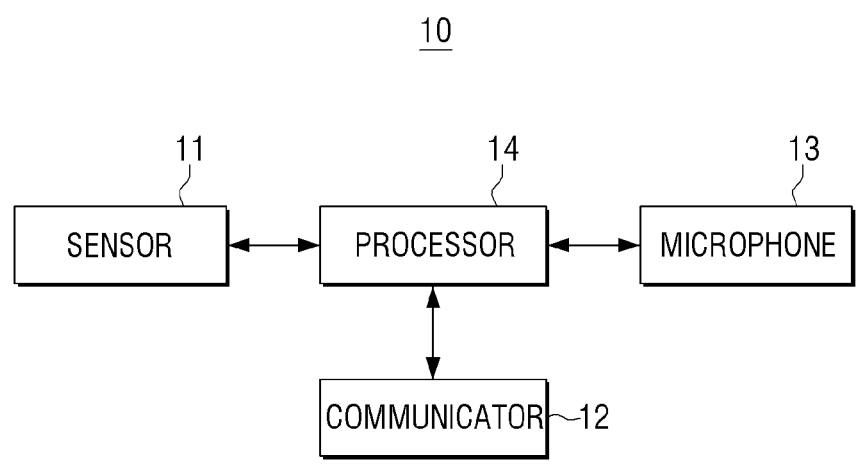
FIG. 1 is a block diagram illustrating an electronic apparatus according to an exemplary embodiment.

Hereinafter, various exemplary embodiments will be explained in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

The terms, "include," "may include," "comprise," "may comprise," etc. of the description are used to indicate that there are features (for example, numbers, functions, operations, elements such as parts, etc.), and they should not exclude the possibilities of additional features. In addition, the terms such as "unit," "-er (-or)," and "module" described in the specification refer to an element for performing at least one function or operation, and may be implemented in hardware, software, or the combination of hardware and software.

In the specification, the terms, "A or B," "at least one of A or/and B" or "one or more than one of A or/and B" may include every possible combination of items listed together. For example, "A or B," "at least one of A and B," or "at least one of A or B" may refer to all cases where (1) at least A is included, (2) at least one B is included, or (3) both at least one A and at least one B are included.

The terms such as "first" and "second" may be used to describe various elements regardless of order and/or priorities thereof, but the elements should not be limited by these terms. These terms may be used for the purpose of distinguishing one element from another element. For example, the first user apparatus and the second user apparatus may be used to indicate different user apparatuses regardless of their order or priority. For example, the first element may be referred to as the second element and vice versa without going beyond the scope of the specification.

When it is recited that an element is "operatively or communicatively coupled with/to" another element, it should be understood that the element is directly connected to the another element or through another element. On the other hand, when it is recited that an element is "directly connected to" another element, it may be understood that there is no other element between the element and the other element.

In the specification, the term, "configured to" may be used interchangeably with, for example, "suitable for," "having the capacity to," "designed to," "adapted to," "made to," or "capable of" depending on circumstances. The term, "configured to," does not necessarily refer to "specifically designed to" in terms of hardware. Instead, the term may refer to "capable of" performing a function along with another apparatuses or parts. For example, "a processor configured to perform A, B and C" may refer to an exclusive processor (for example, an embedded processor) which performs a corresponding operation or a generic-purpose processor (for example, a CPU or an application processor) which may perform a corresponding operation by executing one or more software programs stored in a memory.

The terms used in the following description are provided to explain a specific exemplary embodiment and are not intended to limit the present disclosure. A singular term includes a plural form unless it is intentionally written that way. The terms recited herein including technical and scientific terms may have meanings which are generally understood by those skilled in the technical field of this specification. The terms which are defined in a general dictionary from among the terms of this specification may be interpreted to have the same or similar meaning to those in the related technical field, and should not be interpreted in an ideal or overly perfunctory manner unless it is defined clearly otherwise. Depending on circumstances, the terms defined in this specification should not be interpreted to exclude exemplary embodiments of this specification.

An electronic apparatus according to exemplary embodiments may include at least one among a smart phone, a tablet personal computer, mobile phone, video phone, e-book reader, desktop personal computer, laptop personal computer, netbook computer, workstation, server, personal digital assistant, portable multimedia player, MP3 player, mobile medical device, camera, wearable device, etc. According to various exemplary embodiments, the wearable device may include at least one among an accessory-type device (for example, watch, ring, bracelet, ankle bracelet, necklace, glasses, contact lens, or head-mounted device (HMD)), fabric or clothing-integrated device (for example, e-clothing), body-attached device (for example, skin pad or tattoo), implantation device (for example, implantable circuit), etc.

In an exemplary embodiment, an electronic apparatus may refer to a home appliance. The home appliance may include at least one among a television, digital video disk (DVD) player, audio player, refrigerator, air conditioner, cleaner, oven, microwave, washing machine, air cleaner, set-top box, home automation control panel, security control panel, TV box (for example, Samsung HomeSync™, Apple TV™, or Google TV™), game console (for example, Xbox™, PlayStation™), electronic dictionary, electronic key, camcorder, electronic picture frames, etc.

In another exemplary embodiment, an electronic apparatus may include at least one among various medical devices (for example, various portable medical measuring devices (blood glucose monitoring device, heart rate monitoring device, blood pressure monitoring device, body temperature monitoring device, etc.), magnetic resonance angiography (MRA), magnetic resonance imaging (MRI), computed tomography (CT), camera, ultrasonic machine, etc.), a navigation device, global navigation satellite system (GNSS), event data recorder (EDR), flight data recorder (FDR), car infotainment device, marine electronic equipment (for example, marine navigation device, gyro compass, etc.), avionics, security device, car head unit, industrial or domestic robot, automatic teller's machine (ATM), point of sale of shop, internet of things (for example, light bulb, various sensors, electrical or gas meter, spring cooler, fire alarm, thermostat, streetlamp, toaster, sporting goods, hot-water tank, heater, boiler, etc.), etc.

In another exemplary embodiment, an electronic apparatus may include at least one among furniture or part of a building/structure, electronic board, electronic signature receiving device, projector, various measuring devices (for example, water supply, electricity, gas, radio wave measuring device, etc.), etc. In various exemplary embodiments, an electronic apparatus may be one of the above-described various apparatuses or any combination thereof. In an exemplary embodiment, an electronic apparatus may be a flexible electronic apparatus. In addition, an electronic apparatus according to an exemplary embodiment is not limited to the above-described apparatuses, and may include a new electronic apparatus which is developed with a technological advancement.

Hereinafter, methods and apparatuses consistent with exemplary embodiments will be explained in detail with reference to the accompanying drawings. In the specification, the term of "a user" may refer to a person who is using an electronic apparatus or a device (for example, an artificial intelligence electronic apparatus) which is using an electronic apparatus.

FIG. 1 is a block diagram illustrating an electronic apparatus 10 according to an exemplary embodiment. The electronic apparatus 10 may include a sensor 11, a communicator 12, a microphone 13, and a processor 14.

The sensor 11 may determine the status of the electronic apparatus 10.

The communicator 12 may receive a wireless signal. The wireless signal may be a signal according to WiFi, Bluetooth and 3G communication.

The microphone 13 may convert a voice into an electrical signal. In other words, the microphone 13 may receive a voice signal, convert the signal into an electrical signal, and output the electrical signal.

The processor 13 may determine the status of the electronic apparatus 10 based on the signal output from the sensor 11, determine the location of the electronic apparatus 10 based on at least one among information on a source of the wireless signal received from the communicator 12 and information on an intensity of the wireless signal, and control a recording operation of the voice input through the microphone 13 based on the location information of the electronic apparatus 10 and the status information of the electronic apparatus 10. In addition, the processor 13 may control a voice to be recorded intermittently.

The processor may record a voice input through the microphone 13 for a first time, process the recorded voice data for a second time, and stop recording a third time. For example, the processor 14 may record a voice input through the microphone 13 for one second, process the recorded voice data for two seconds, and stop recording for one minute.

The processor 14 may determine the number of speakers from the recorded voice data, and if the number of speakers is greater than n (n is a natural number), set the mode of the electronic apparatus 10 to a first mode. If the number of speakers is smaller than n, the processor 14 may stop a recording operation for a predetermined time and resume recording after the predetermined time elapses. The processor 14 may change the mode of the electronic apparatus 10 from the first mode to a vibration mode. In addition, the processor 14 may change the mode of the electronic apparatus 10 from the first mode to a mute mode. Further, the processor 14 may control the communicator 12 to transmit a predetermined message to a caller when a call is received in the first mode.

The electronic apparatus 10 may further include a display, and the processor 14 may control to display a UI screen for receiving a function to be executed in the first mode from a user.

The processor 14 may generate a sub frame by dividing recorded voice data by a predetermined time unit, extracting a plurality of feature values from the sub frame, and calculating an average and a standard deviation of the plurality of feature values.

The processor 14 may determine that the electronic apparatus 10 is at the first location based on log data of an application program which is executed by the electronic apparatus 10. In addition, the processor 14 may stop a recording operation when the electronic apparatus 10 is at the first location. For example, if a user is at home, the processor 14 may determine that the current location of the user is home based on accumulated log data, and may not perform a recording operation to detect a meeting.

The processor 14 may control a recording operation based on time and day information. For example, if it is 2 a.m., the processor 14 may not perform a recording operation to detect a meeting. In addition, the processor 14 may not perform a recording operation to detect a meeting if it is Sunday.

The processor 14 may control a recording operation based on schedule information set in the electronic apparatus 10. For example, if a meeting is scheduled to start at 9 a.m., the processor 14 may perform a recording operation to detect a meeting at 9 a.m.

Figure 2A:
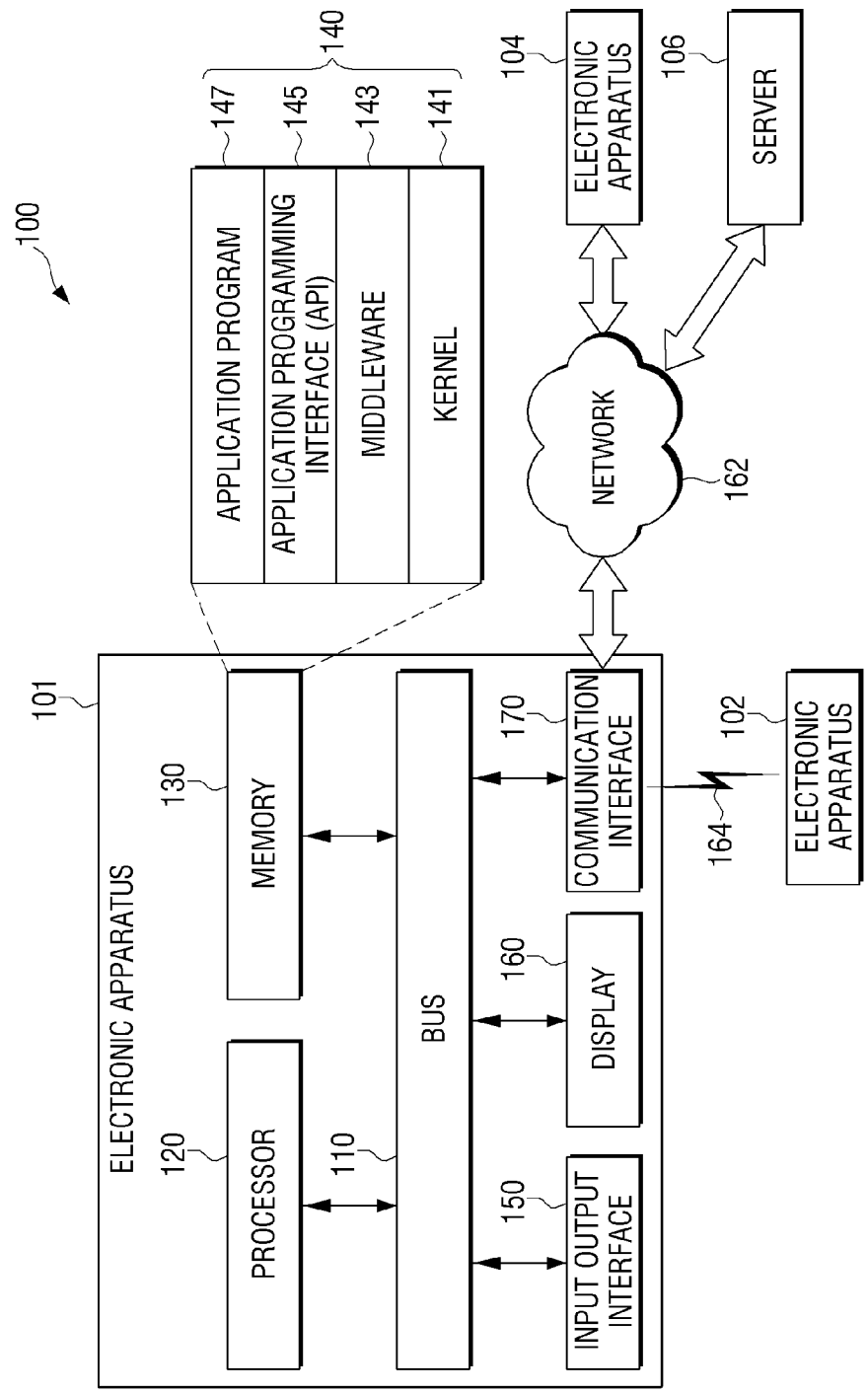
FIGS. 2A and 2B are detailed block diagrams of an electronic apparatus according to an exemplary embodiment.

FIG. 2A illustrates a electronic apparatus 101 in a network environment 100 according to another exemplary embodiment. The electronic apparatus 101 may include a bus 110, a processor 120, a memory 130, an input/output interface 150, a display 160, and a communication interface 170. According to various exemplary embodiments, one or more elements may be omitted from the electronic apparatus 1010, and in other exemplary embodiments, one or more elements may be added.

The bus 110, for example, may connect elements 120-170 with each other, and may include a circuit for communication (for example, transmitting a control message and/or data) between elements 120-170.

The processor 120 may include one or more of a central processing unit (CPU), application processor (AP) and communication processor (CP). The processor 120, for example, may perform an operation or data processing regarding control and/or communication of at least one of the other elements of the electronic apparatus 101.

The memory 130 may include a volatile and/or nonvolatile memory. The memory 130, for example, may store a command or data regarding at least one of the other elements of the electronic apparatus 101. According to an exemplary embodiment, the memory 130 may store software and/or a program 140. The program 140, for example, may include kernel 141, middleware 143, application programming interface (API) 145, and/or application program (or "application," "APP") 147, etc. At least part of the kernel 141, the middleware 143 or the API 145 may be referred to as an operating system (OS).

In particular, various application programs executed by the electronic apparatus 101 may generate various log data. The electronic apparatus 101 may store the generated log data in the memory 130. In addition, the electronic apparatus 10 may predict the current location and situation of a user by analyzing the log data. For example, the log data may include information regarding the day and time and information regarding the schedule of a user. The electronic apparatus 100 may predict the current location and situation of the user by analyzing the information regarding the day and time and the information regarding the schedule of the user.

The kernel 141, for example, may control or manage system resources (for example, the bus 110, the processor 120, the memory 130, etc.) which are used to perform an operation or a function in other programs (for example, the middleware 143, the API 145 or the application program 147). In addition, the kernel 141 may provide an interface to control or manage the system resources by accessing individual elements of the electronic apparatus 101 in the middleware 143, the API 145 or the application program 147.

The middleware 143, for example, may perform a relay operation so that the API 145 or the application program 147 may communicate with the kernel 141 to exchange data.

In addition, the middleware 143 may process one or more job requests received from the application program 147 based on priorities. For example, the middleware 143 may give a priority to at least one among the application programs 147 to use the system resources (for example, the bus 110, the processor 120, the memory 130, etc.) of the electronic apparatus 101. For instance, the middleware 143 may process the one or more job requests according to the priority which is given to at least one among the job requests so as to perform scheduling or load balancing with respect to the one or more job request.

The API 145, for example, is an interface for the application 147 to control functions provided in the kernel 141 or the middleware 143, and may include at least one interface or function (for example, a command) to control a file, control a window, process an image, control a character, etc.

The input/output interface 150, for example, may be served as an interface which transmits a command or data input from a user or other external apparatuses to another element(s) of the electronic apparatus 101. In addition, the input/output interface 150 may output a command or data received from another element(s) of the electronic apparatus 101 to a user or other external apparatuses.

The display 160, for example, may include a liquid crystal display (LCD), light-emitting diode (LED) display, organic light-emitting diode (OLED) display, microelectromechanical systems (MEMS) display, or electronic paper display. The display 160, for example, may display various contents (for example, text, image, video, icon, symbol, etc.) to a user.

The display 160 may include a touch screen, and may receive the inputs of touch, gesture, proximity or hovering using, for example, an electronic pen or a user's body part.

The communication interface 170, for example, may set communication between the electronic apparatus 101 and an external apparatus (for example, a first external electronic apparatus 102, a second external apparatus 104, or a server 106). For example, the communication interface 170 may be connected to a network 162 via wireless communication or wired communication to communicate with an external apparatus (for example, the second external apparatus 104 or the server 106).

The wireless communication, for example, is a cellular communication protocol and, for example, may use at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). In addition, the wireless communication, for example, may include near-field communication 164. The near-field communication 164, for example, may include at least one among wireless fidelity (WiFi), Bluetooth, near field communication (NFC), etc. In particular, the electronic apparatus 101 may extract WiFi information from a WiFi signal and determine a user's current location (for example, a user's seat) based on the WiFi information.

The global navigation satellite system (GNSS) may include at least one among, for example, Global Positioning System (GPS), Global Navigation Satellite System (Glonass), Beidou Navigation Satellite System (hereinafter, referred to as "Beidou") or Galileo, and the European global satellite-based navigation system according to the region or band where the GNSS is used. Hereinafter, in the specification, "GPS" and "GNSS" may be used interchangeably. In particular, the electronic apparatus 101 may determine a user's current position using a GPS.

The wired communication, for example, may include at least one among a universal serial bus (USB), high definition multimedia interface (HDMI), recommended standard 232 (RS-232), plain old telephone service (POTS), etc. The network 162 may include telecommunication network, for example, at least one among computer network (such as LAN or WAN), Internet, and telephone network.

Each of the first and second external apparatuses 102, 104 may be the same apparatus as the electronic apparatus 101 or different from the electronic apparatus 101. According to an exemplary embodiment, the server 106 may include one or more groups or servers. According to various exemplary embodiments, all or a part of operations executed by the electronic apparatus 101 may be executed by one or a plurality of electronic apparatuses (for example, the electronic apparatus 102, 104 or the server 106). According to an exemplary embodiment, when the electronic apparatus 101 needs to perform a certain function or service automatically or upon request, the electronic apparatus 101 may request at least part of the related function or service to be performed by another electronic apparatus (for example, the electronic apparatuses 102, 104, or the server 106) additionally or alternatively. Another electronic apparatus (for example, the electronic apparatuses 102, 104, or the server 106) may perform the requested function or the additional function, and transmit the result to the electronic apparatus 101. The electronic apparatus 101 may receive the result, and process the received result as it is or additionally to provide the requested function or service. To do so, for example, cloud computing, distributed computing, or client-service computing technologies may be used.

Figure 2B:
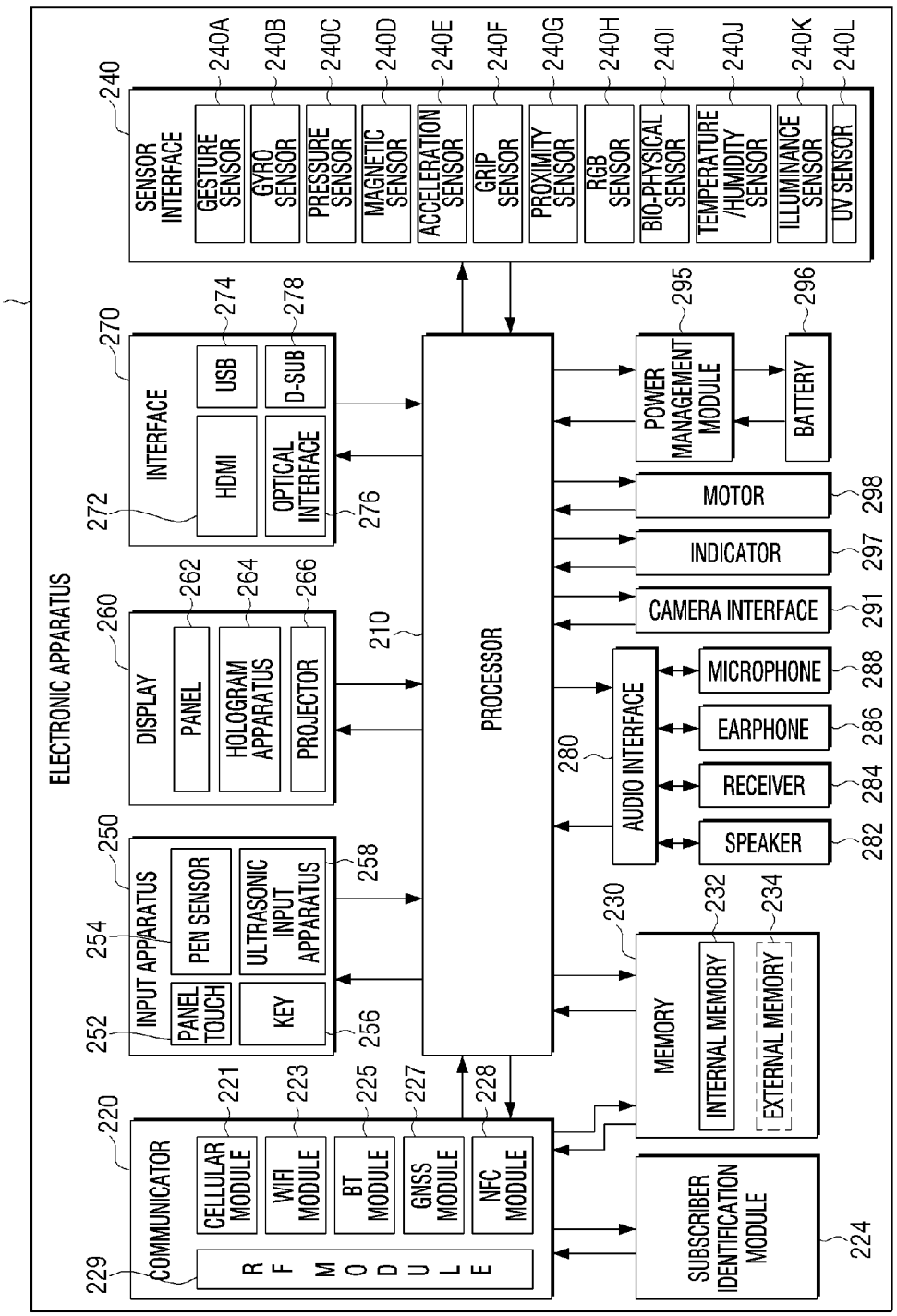

FIG. 2B is a detailed block diagram illustrating an electronic apparatus 201 according to an exemplary embodiment. The electronic apparatus 201, for example, may include all or part of the electronic apparatus 101 illustrated in FIG. 1. The electronic apparatus 201 may include one or more processors (for example, an application processor (AP) 210, a communicator 220, a subscriber identification module 224, a memory 230, a sensor interface 240, an input apparatus 250, a display 260, an interface 270, an audio interface 280, a camera interface 291, a power management module 295, a battery 296, an indicator 297, and a motor 298.

The processor 210, for example, may drive an operating system or an application program to control a plurality of hardware or software elements connected to the processor 210, and perform various data processing and operations.

The processor 210, for example, may be realized as a system on chip (SoC). According to an exemplary embodiment, the processor 210 may further include a graphic processing unit (GPU) and/or an image signal processor. The processor 210 may include at least part (for example, a cellular module 221) of the elements illustrated in FIG. 2. The processor 210 may load and process a command or data received from at least one among other elements (for example, a non-volatile memory) in a volatile memory and store various data in the non-volatile memory.

The communicator 220 may have a configuration which is the same as or similar to the communication interface 170 in FIG. 1. The communicator 220, for example, may include the cellular module 221, a WiFi module 223, a Bluetooth module 225, a GNSS module 227 (for example, a GPS module, a Glonass module, a Beidou module, or a Galileo module), an NFC module 228, and a radio frequency (RF) module 229.

The cellular module 221, for example, may provide a voice call, a video call, a text service, or internet service via a communication network. According to an exemplary embodiment, the cellular module 221 may identify and authenticate the electronic apparatus 201 within a communication network using the subscriber identification module 224 (for example, a SIM card). According to an exemplary embodiment, the cellular module 221 may perform at least a part of the functions which can be provided by the processor 210. According to an exemplary embodiment, the cellular module 221 may include a communication processor (CP).

Each of the WiFi module 223, the Bluetooth module 225, the GNSS module 227 or the NFC module 228, for example, may include a processor to process data which are transmitted/received through a corresponding module. According to an exemplary embodiment, at least a part of the WiFi module 223, the Bluetooth module 225, the GNSS module 227 and the NFC module 228 (for example, more than two modules) may be included in a single integrated chip (IC) or an IC package.

The RF module 229, for example, may transmit/receive a communication signal (for example, an RF signal). The RF module 229, for example, may include a transceiver, a power amp module (PAM), a frequency filter, an antenna, etc. According to anther exemplary embodiment, at least one among the cellular module 221, the WiFi module 223, the Bluetooth module 225, the GNSS module 227, and the NFC module 228 may transmit/receive an RF signal through a separate RF module.

The subscriber identification module 224, for example, may include a card including a subscriber identification module and/or an embedded SIM, and may include an integrated circuit card identifier (ICCID) or international mobile subscriber identity (IMSI).

The memory 230, for example, may include an internal memory 232 or an external memory 234. The internal memory 232, for example, may include at least one among volatile memory (for example, dynamic RAM (DRAM), static RAM (SRAM), synchronous dynamic RAM (SDRAM), etc.), non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash, NOR flash, etc.), hard drive, solid static drive (SSD), etc.

The external memory 234 may further include a flash drive, for example, compact flash (CF), secure digital (SD), micro secure digital (Micro-SD), mini secure digital (Mini-SD), extreme digital (xD), multi-media card (MMC), memory stick, etc. The external memory 234 may connect to the electronic apparatus 201 functionally and/or physically through various interfaces.

The sensor interface 240, for example, may sense the operation status of the electronic apparatus 201, and may convert the measured or sensed information to an electrical signal. The sensor interface 240, for example, may include at least one among a gesture sensor 240A, a gyro sensor 240B, a pressure sensor 240C, a magnetic sensor 240D, an acceleration sensor 240E, a grip sensor 240F, a proximity sensor 240G, a color sensor 240H (for example, a red, green, blue (RGB) sensor), a bio-physical sensor 240I, a temperature/humidity sensor 240J, an illumination sensor 240K, and an ultraviolet (UV) sensor. Additionally or alternatively, the sensor interface 240, for example, may include an E-nose sensor, an electrocardiogram (EMG) sensor, an electroencephalogram (EEG) sensor, an electrocardiogram (ECG) sensor, an infrared (IR) sensor, an iris sensor and/or a fingerprint sensor. The sensor interface 240 may further include a control circuit to control at least one or more sensors therein. According to an exemplary embodiment, the electronic apparatus 201 may further include a processor configured to control the sensor interface 240 in addition to or separately from the processor 210 so as to control the sensor interface 240 while the processor 210 is in a sleep state.

In particular, the processor 210 may predict a user's movement using data output from at least one among the gesture sensor 240A, the gyro sensor 240B and the acceleration sensor 240E. For example, the processor 210 may analyze the output of the acceleration sensor 240E to determine whether a user is still, walking or running.

The input apparatus 250, for example, may include a touch panel 252, a (digital) pen sensor 254, a key 256 or an ultrasonic input apparatus 258. The touch panel 252, for example, may use at least one among a capacitive method, a resistive method, an infrared method, and an ultrasonic method. In addition, the touch panel 252 may further include a control circuit. The touch panel 252 may further include a tactile layer and provide a tactile response to a user.

The (digital) pen sensor 254, for example, may be part of a touch panel or include a separate detection sheet. The key 256, for example, may include a physical button, an optical key, or a keypad. The ultrasonic input apparatus 258 may sense an ultrasonic wave generated from an input tool through a microphone to check data corresponding to the sensed ultrasonic wave.

The display 260 may include a panel 262, a hologram apparatus 264, or a projector 266. The panel 262 may include an element which is identical or similar to the display 160 of FIG. 1. The panel 262, for example, may be flexible, transparent or wearable. The panel 262 may be configured as a single module along with the touch panel 252. The hologram apparatus 264 may show a stereoscopic image in the air using interference of light. The projector 266 may display an image by projecting light on a screen. The screen, for example, may be provided inside or outside the electronic apparatus 201. According to an exemplary embodiment, the display 260 may further include a control circuit to control the panel 262, the hologram apparatus 264, or the projector 266.

The interface 270, for example, may include a high-definition multimedia interface (HDMI) 272, a universal serial bus (USB) 274, an optical interface 276, or a D-sub-miniature 278. The interface 270, for example, may be included in the communication interface illustrated in FIG. 1. Additionally or alternatively, the interface 270, for example, may include a mobile high-definition link (MHL) interface, a secure digital (SD) card/multi-media card (MMC) interface, or Infrared data association (IrDA) standard interface.

The audio interface 280, for example, may convert sound and an electrical signal in bilateral directions. At least a part of the elements of the audio interface 280, for example, may be included in the input/output interface 145 illustrated in FIG. 1. The audio interface 280, for example, may process sound information which is input or output through a speaker 282, a receiver 284, an earphone 286, the microphone 288, etc. In particular, the processor 210 may analyze sound information which is input through the microphone 288 to detect a meeting situation.

The camera interface 291, for example, is an apparatus to photograph a still image and a moving image, and according to an exemplary embodiment, may include one or more image sensors (for example, a front sensor or a rear sensor), a lens, an image signal processor (ISP), or a flash (for example, LED, xenon lamp, etc.).

The power management module 295, for example, may manage the power of the electronic apparatus 201. According to an exemplary embodiment, the power management module 295 may include a power management integrated circuit (PMIC), a charge integrated circuit (charger IC), or battery or fuel gauge. The PMIC may have wired and/or wireless recharging method. The wireless recharging method, for example, may include a magnetic resonance method, a magnetic induction method or an electronic wave method, and may further include an additional circuit for wireless recharging such as a coil loop, a resonance circuit, a rectifier, etc. The battery gauge, for example, may measure the level of the battery 296, voltage during recharging, electrical current or temperature. The battery 296 may include a rechargeable battery and/or a solar battery.

The indicator 297 may display a specific status of the electronic apparatus 201 or a part of the electronic apparatus (for example, the processor 210). For example, the indicator 297 may display a booting state, a message state, a recharging state, etc. The motor 298 may convert an electrical signal into a mechanical vibration, and may generate a vibration effect, a haptic effect, etc. Albeit not illustrated, the electronic apparatus 201 may include a processor (for example, GPU) to support a mobile TV. The processor for supporting a mobile TV, for example, may process media data according to standards such as digital multimedia broadcasting (DMB), digital video broadcasting (DVB), mediaFlo™, etc.

Each element described in the present specification may consist of one or more than one components, and the name of the components may vary depending on the type of electronic apparatuses. In various exemplary embodiments, an electronic apparatus may include at least one among elements which are described in the present specification, and some of the elements may be omitted or other elements may be added. In addition, some of the elements of an electronic apparatus according to the various exemplary embodiments may be combined to form a single entity which performs the same functions as those elements before being combined.

Although exemplary embodiments are provided for explanation and understanding of technical features, the present disclosure is not intended to limit the scope of the technologies thereto. Accordingly, the scope of the present specification should be interpreted to include all variations and various other exemplary embodiments based on the technical concept of the present specification.

Figure 3:
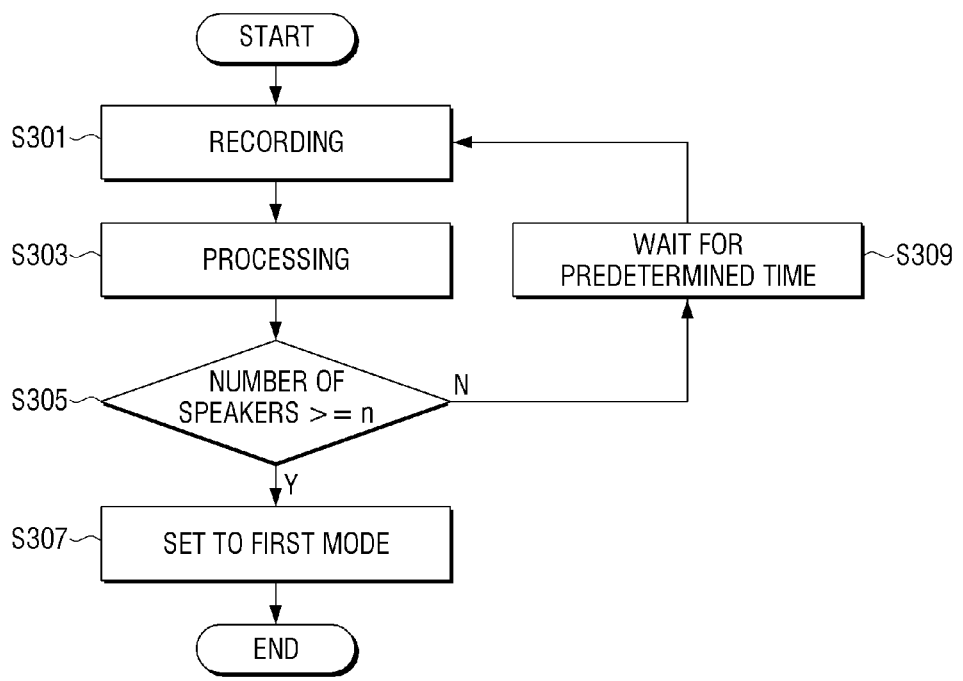
FIG. 3 is a flowchart illustrating the process of detecting a meeting by an electronic apparatus according to an exemplary embodiment.

FIG. 3 is a flowchart illustrating the process of detecting a meeting by an electronic apparatus according to an exemplary embodiment.

The electronic apparatus 201 may determine significant locations, such as a company or a home, through a significant location detection module. The significant location detection module may provide information regarding significant locations using log data generated by various application programs and data generated by various hardware.

The electronic apparatus 201 may determine a meeting situation using at least one among user seat information based on the microphone 288, the acceleration sensor 240E, time information, date information, user schedule information, GPS information, WiFi information and significant location information, and set its mode to the first mode. In the first mode, the electronic apparatus 201 may provide a meeting-related service. For example, the electronic apparatus 201 may operate in a mute mode or a vibration mode in the first mode. In addition, the electronic apparatus 10 may control the communicator 220 to transmit a preset message to a source of a telephone call when the telephone call is received in the first mode.

The electronic apparatus 201 may determine whether there is a meeting using the microphone 288. For example, the electronic apparatus 10 may record ambient voices using the microphone 288, analyze the recorded data to detect human voices, and determine the number of speakers to detect whether there is a meeting.

In addition, the electronic apparatus 201 may determine whether there is a meeting using the microphone 288 and the acceleration sensor 240E. The electronic apparatus 201 may determine the behavior of a user (whether the user is not moving, walking, running, moving in a car, or riding a bicycle) using the acceleration sensor 240E, and determine whether to operate a microphone and perform recording based on the determined status. For example, the electronic apparatus 201 may operate the microphone 288, record voices input through the microphone 288 and analyze the recorded data to determine a meeting when the electronic apparatus 201 is in a steady state for more than five minutes.

In addition, the electronic apparatus 201 may determine whether there is a meeting using the microphone 299 and a user's work hour information. For example, the electronic apparatus 201 may analyze log data to determine a user's work hour and record voices through the microphone 288 and analyze the recorded data to determine whether there is a meeting only during the work hour.

Further, the electronic apparatus 201 may determine whether there is a meeting using the microphone 288 and time and date information. For example, the electronic apparatus 201 may refer to the date and day information to record voices through the microphone 288, and analyze the recorded data to determine whether there is a meeting only during week days.

The electronic apparatus 201 may determine whether there is a meeting using the microphone 288 and calendar information. For example, the electronic apparatus 201 may record voices through the microphone 288 and analyze the recorded data to determine whether there is a meeting during a meeting time input by a user using the calendar information.

The electronic apparatus 201 may determine whether there is a meeting using the microphone 288, the acceleration sensor 240E, GPS, time information and significant location information. For example, the electronic apparatus 201 may record voices through the microphone 288 and analyze the recorded data to determine whether there is a meeting only when a user is not in his or her seat based on the microphone 288 and WiFi information.

The electronic apparatus 201 may determine whether there is a meeting using the microphone 288, calendar information and significant location information. For example, the electronic apparatus 201 may check a meeting schedule stored in the calendar information, determine a user's seat based on the WiFi information at a time when the meeting is started, and if the user is not in his or her seat, record voices through the microphone 288 and analyze the recorded data to determine whether there is a meeting.

In addition, the electronic apparatus 201 may determine whether there is a meeting using the microphone 288 and a user's seat information. For example, the electronic apparatus 201 may record voices through the microphone 288 and analyze the recorded data to determine whether there is a meeting when the user is not in his or her seat.

In addition, the electronic apparatus 201 may determine whether there is a meeting using the microphone 288, user seat information and calendar information. For example, if it is determined that a user is not in his or her seat when it is time to start a meeting stored in the calendar information, the electronic apparatus 201 may record voices through the microphone 288 and analyze the recorded data to determine whether there is a meeting.

In addition, the electronic apparatus 201 may determine whether there is a meeting using the microphone 299, user seat information, calendar information and acceleration sensor information. For example, if it is determined that a user is not in his or her seat when it is time to start a meeting stored in the calendar information and the electronic apparatus 201 is in a steady state, the electronic apparatus 201 may record voices through the microphone 288 and analyze the recorded data to determine whether there is a meeting.

If it is determined that the user is at home, the electronic apparatus 201 does not perform any operation to detect a meeting. If it is determined that the user is in his office, the electronic apparatus 201 may perform an operation to detect a meeting. If the user goes to work and the electronic apparatus 201 is in a steady state for a predetermined time, the electronic apparatus 201 may perform an operation to detect a meeting. For example, if the electronic apparatus 201 is in a steady state for five minutes, the electronic apparatus 201 may perform an operation to detect a meeting. Specifically, the processor 210 may determine whether the electronic apparatus 201 is in a steady state based on the output value of the acceleration sensor 240E.

In addition, the electronic apparatus 201 may perform an operation to detect a meeting based on user schedule information. For example, if a meeting is scheduled at "17:00 on July 16" on the user's calendar App, the electronic apparatus 201 may perform an operation to detect a meeting at 17:00 on July 16. Alternatively, the electronic apparatus 201 may perform an operation to detect a meeting five minutes before the meeting start time stored in the calendar App.

In order to determine whether a user is at a meeting, the electronic apparatus 201 records voices input through the microphone 288 (S301). The recording may be performed only for a predetermined time. For example, the electronic apparatus 201 may record voices input through the microphone 288 for one second and store the recorded voice data in a memory.

The electronic apparatus 201 may process the recorded voice data for a predetermined time to determine the number of speakers (S303). The specific method through which the electronic apparatus 201 analyzes the recorded voice data to identify human voices and determine the number of speakers will be described in detail with reference to FIG. 5.

The electronic apparatus 201 determines whether the number speakers is more than n (n is a natural number) (S303). Here, n may be determined by a user input. The processor 210 may control the display 260 to display a UI for receiving the number of speakers from a user. For example, if a user inputs '2' as the number of speakers, the processor 210 may process voice data to identify speakers and determine whether the number of speakers is more than '2'.

If the number of speakers is more than n (S305-Y), the electronic apparatus 201 may set the mode of the electronic apparatus 201 to the first mode (S307). In the first mode, the electronic apparatus 201 may provide a meeting-related service. The meeting-related service may be determined based on a user input. The electronic apparatus 201 may display a list of functions to be performed in the first mode on the screen, receive a user input and provide a meeting-related service.

For example, the electronic apparatus 201 may operate in a mute mode or a vibration mode in the first mode. In addition, if a telephone call is received in the first mode, the electronic apparatus 201 may transmit a predetermined message to a source of the telephone call. The electronic apparatus 201 may provide a user with a notification regarding whether to record a meeting through a pop-up window, receive a user input, and record the meeting based on the user input. If the voices of speakers in a meeting are detected and one of the speakers is speaking for more than a predetermined time, the electronic apparatus 201 may display a notification message. In addition, the electronic apparatus 201 may detect the voices of the speakers in the meeting and transmit recorded voice data automatically to the detected speakers after the meeting is completed. Further, the electronic apparatus 201 may transmit the recorded voice data based on the information set in the calendar App after the meeting is completed. For example, if five persons are registered as attendees of the meeting in the calendar App, the electronic apparatus 201 may transmit the recorded voice data to the five persons automatically.

In addition, the electronic apparatus 201 may provide a meeting-related service in the first mode even without a user input.

Further, the electronic apparatus 201 may transmit information regarding meeting place, meeting time, meeting theme, and whether a conference room is reserved.

In step S305, if the number of speakers is smaller than n (S305-N), the electronic apparatus 201 may stop recording for a predetermined time to be in a standby state (S309). For example, the electronic apparatus 201 may stop recording for one minute and after one minute elapses, may resume recording. When a recording operation is performed, a considerable amount of power is consumed. Thus, the electronic apparatus 201 may stop recording for a predetermined time and resume recording after the predetermined time elapses in order to reduce unnecessary consumption of power. For example, the electronic apparatus 201 may perform recording for one second, process the recoded data for analyzing the recorded data for two seconds, be in a standby state for one minute, and resume recording after one minute elapses. In other words, the electronic apparatus 201 may perform recording intermittently in order to detect a meeting situation.

Figure 4:
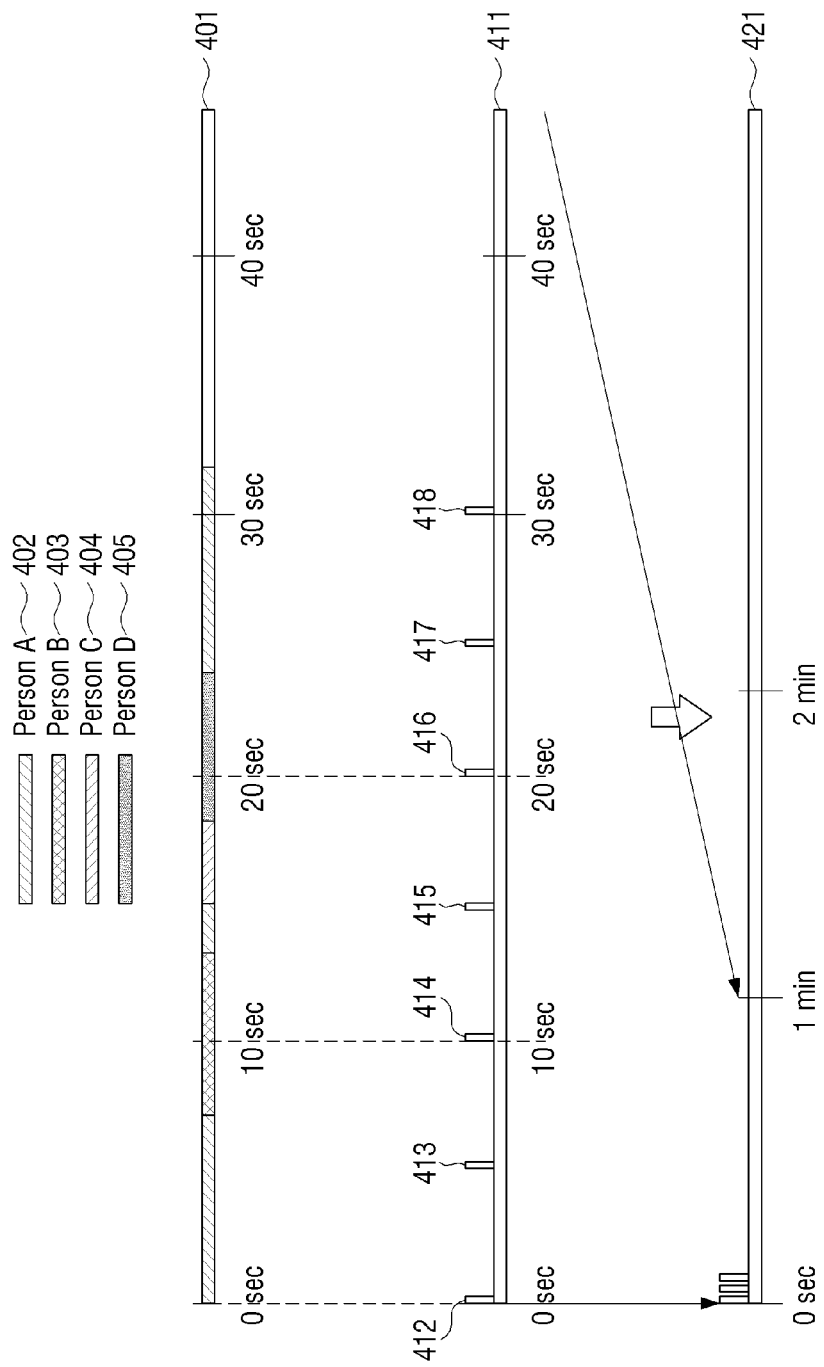
FIG. 4 is a view illustrating intermittent recording to determine the number of speakers in a meeting according to an exemplary embodiment.

FIG. 4 is a view illustrating an example of performing recording intermittently in order to determine the number of speakers in a meeting by the electronic apparatus 201 according to an exemplary embodiment.

The electronic apparatus 201 according to an exemplary embodiment may record a voice input through the microphone 288 for the first time, process the recorded voice data for the second time, and stop recording for the third time in order to detect a meeting. For example, the electronic apparatus 201 may perform recording for one second, process the recorded data for two seconds, and stop recording for one minute in order to detect a meeting.

Hereinafter, it is described that recording is performed for one second at intervals of five seconds for convenience of explanation, but if recording is performed to detect a meeting, the electronic apparatus 201 may change recording time, processing time, or recording suspension time in various ways in order to reduce power consumption resulting from the recording.

FIG. 4 illustrates timing views 401, 411 and 421. The timing view 401 shows that four speakers 402, 403, 404, 405 who attend a meeting and their speaking times (401). The speaker A (402) continuously speaks from 0 seconds to 32 seconds, and the speaker B (403) speaks from approximately 7 seconds to 13 seconds. The speaker C (404) speaks from 15 seconds to 24 seconds, and the speaker D (405) speaks from 18 seconds to 24 seconds. The speaker A (402) and the speaker B (403) speak from approximately 7 seconds to 13 seconds, the speaker A (402) and the speaker C (404) speak from approximately 15 seconds to 18 seconds, and the speaker A (402), the speaker C (404), and the speaker D (405) speak from approximately 18 seconds to 24 seconds.

The timing view 411 illustrates times 412, 413, 414, 415, 416, 417, 418 where the electronic apparatus 201 records a voice intermittently. The electronic apparatus 201 may perform recording for one second at intervals of 5 seconds in order to reduce power consumption.

For example, the electronic apparatus 201 may perform recording in the section of 0 seconds to 1 second (412), in the section of 5 seconds to 6 seconds (413), in the section of 10 seconds to 11 seconds (414), in the section of 15 seconds to 16 seconds (415), in the section of 20 seconds to 21 seconds (416), in the section of 25 seconds to 26 seconds (417), and in the section of 30 seconds to 31 seconds (418). The recorded data may be analyzed to determine the number of speakers.

Specifically, the electronic apparatus 201 may perform recording from 0 seconds to 1 second and stop recording from 1 second to 5 seconds. The electronic apparatus 201 may perform recording from 5 seconds to 6 seconds and stop recording from 6 seconds to 10 seconds. As such, the electronic apparatus 201 may repeat the process of recording a voice for one second and stop recording for four seconds.

The electronic apparatus 201 may determine that the number of speakers is "2" based on the data recorded from 10 seconds to 11 seconds (414) from among the recorded data. In addition, the electronic apparatus 201 may determine that the number of speakers is "2" based on the data recorded from 15 seconds to 16 seconds (415). Further, the electronic apparatus 201 may determine that the number of speakers is "3" based on the data recorded from 20 seconds to 21 seconds (416).

If "2" is input as the number of speakers for determining a meeting, the electronic apparatus 201 may stop recording when the number of speakers is less than "2," and wait for one minute before resuming recording. After one minute elapses, the electronic apparatus 201 may perform recording for five seconds, three times, at intervals of 10 seconds. In other words, the electronic apparatus 201 may perform recording for five seconds, stop recording for five seconds, resume recording for five seconds, stop recording for five seconds again, resume recording for five seconds, and then stop recording for five seconds again. If the number of speakers is not determined based on the intermittent recording of one second, the electronic apparatus 201 may extend the recording time to five seconds after one minute elapses.

The timing view 421 illustrates the operation of recording for five seconds at intervals of 10 seconds. The electronic apparatus 201 may repeat the process of five-second recording at intervals of 10 seconds until the number of speakers is determined to be "2".

In addition, the electronic apparatus 201 may further reduce the time of intermittent recording in order to reduce power consumption resulting from the recording. For example, the electronic apparatus 201 may perform recording for one second, stop recording, and analyze the recorded data for two seconds to determine the number of speakers. If the number of speakers is smaller than the number of speakers which is input from a user, the electronic apparatus 201 may be in a standby state, resume recording for one second and analyze the recorded data for two seconds to determine the number of speakers. The electronic apparatus 201 may repeat the intermittent recording until the number of speakers is equal to or greater than the number of speakers, which is input from the user. In other words, the electronic apparatus 201 may repeat the operations of performing recording for one second, analyzing the recorded data for two seconds, waiting for one minute, performing recording again for one second, analyzing the recorded data for two seconds, and waiting for one minute until the number of speakers is identified.

Figure 5:
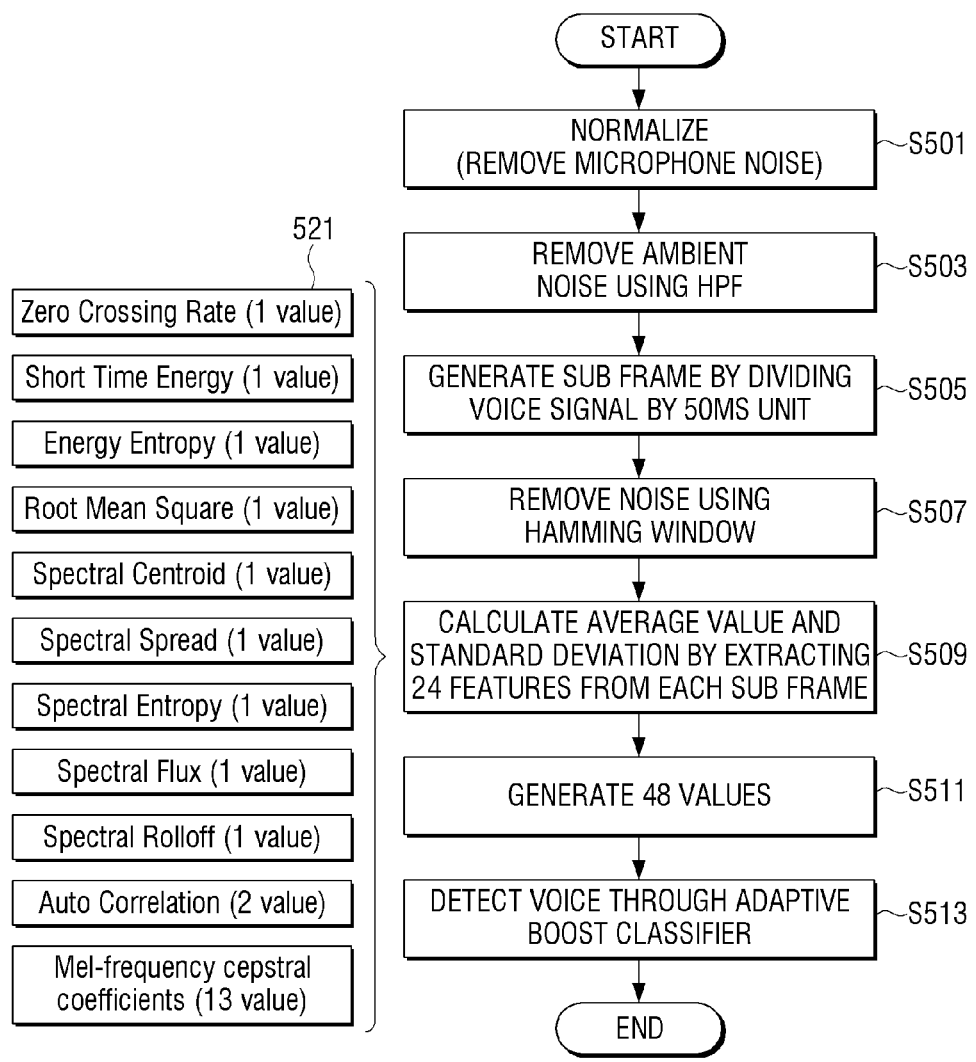
FIG. 5 is a flowchart illustrating the processing of recorded data according to an exemplary embodiment.

FIG. 5 is a view illustrating the processing of recorded data in the electronic apparatus 201 according to an exemplary embodiment.

The electronic apparatus 201 normalizes the recorded voice data in order to remove microphone noise from the voice data which is recorded through the intermittent recording (S501). The electronic apparatus 201 removes ambient environment noise using a High Pass Filter (HPF) (S503). After removing the microphone noise from the voice data, the electronic apparatus 201 generates a sub frame by dividing the voice data by 50 ms unit so that the voice data can be processed (S505). Here, the unit of 50 ms is only an example, and the voice data may be processed after being divided by a greater or smaller unit. In the process of generating a sub frame by dividing the voice data by 50 ms unit, noise may be generated, and the electronic apparatus 201 removes the noise which is generated in the process of generating the sub frame using a hamming window (S507). The electronic apparatus 201 extracts 24 features values 521 from each sub frame, and calculates an average value and a standard deviation with respect to each of the feature values (S509) to generate a total of 48 values (S511).

The electronic apparatus 201 may detect the voice of a speaker through an adaptive boost classifier with respect to the 48 values (S513).

Figure 6:
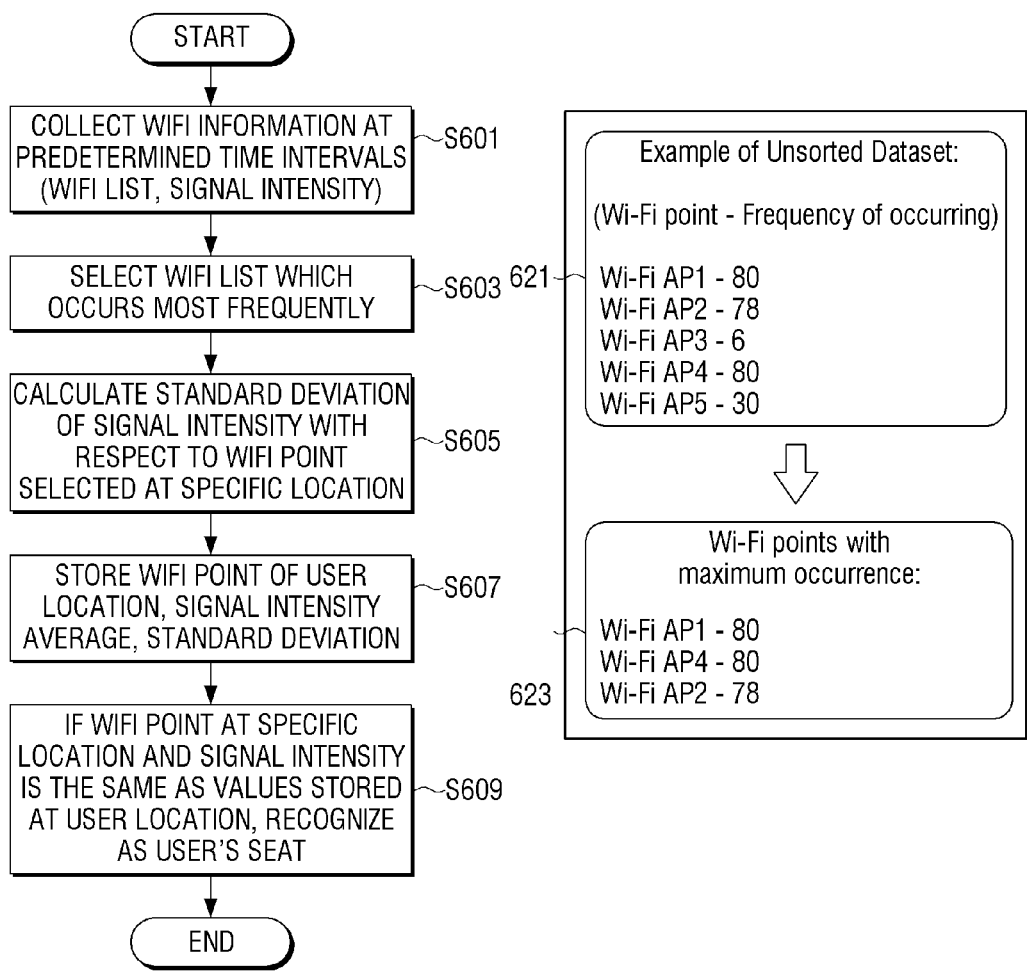
FIG. 6 is a flowchart illustrating the process of detecting the current location of an electronic apparatus using WiFi information according to an exemplary embodiment.

FIG. 6 is a view illustrating the process of detecting the current location of the electronic apparatus 201 using WiFi information in the electronic apparatus 201 according to an exemplary embodiment.

The electronic apparatus 201 may receive a wireless signal through the communicator 220. The wireless signal may be, for example, a WiFi and Bluetooth signal. The wireless signal may include intrinsic ID information. In addition, the wireless signal may include intensity information, that is, the strength information of the signal. The electronic apparatus 201 may measure the intensity of the received wireless signal. The electronic apparatus 210 may measure the intensity of the wireless signal at predetermined time intervals and calculate an average and a standard deviation with respect to the measured intensity value of the wireless signal to generate the intensity information of the wireless signal. For example, if a WiFi signal is received at a user's seat in the office, the electronic apparatus 201 may measure the WiFi signal for 24 hours at intervals of five minutes at the present position and calculate the average value and the standard deviation of the measured WiFi signal to use the intensity information.

FIG. 6 illustrates WiFi lists 621, 623. The electronic apparatus 201 collects WiFi information at predetermined time intervals, for example, at intervals of five minutes (S601). The WiFi information may include the name of a WiFi point which sends the WiFi signal and the intensity of the signal. The WiFi point may be an Access Point (AP). The electronic apparatus, for example, may collect WiFi information for 24 hours and store a list regarding the collected WiFi information. In addition, the electronic apparatus 201 may store a list 621 which includes information regarding how many times each WiFi point has been detected. For example, 80 times of AP1, 78 times of AP2, 6 times of AP3, 80 times of AP4, and 30 times of AP5 may be detected from the WiFi list 621. The electronic apparatus 201 may detect a WiFi list 623 which are the most frequent points from the WiFi list 621 (S603).

The electronic apparatus 201 calculates the average and the standard deviation of WiFi signal intensity at a specific position with respect to the selected list 623. The electronic apparatus 201 may generate a WiFi list including WiFi signals which are received at the user's position in a descending order. For example, 80 times of AP1, 80 times of AP4, and 78 times of AP2 may be detected and included in a WiFi list of high frequency.

The electronic apparatus 201 calculates the average and standard deviation of signal intensity of the WiFi signal which are detected 80 times with respect to AP1. In addition, the electronic apparatus 201 calculates the average and standard deviation of signal intensity of the WiFi signal which are detected 80 times with respect to AP4. The electronic apparatus 201 calculates the average and standard deviation of signal intensity of the WiFi signal which are detected 78 times with respect to AP2. Further, the electronic apparatus 201 stores WiFi point, WiFi signal intensity, average, and standard deviation at the user's seat in a memory (S607).

Subsequently, when a WiFi signal is received, the electronic apparatus 201 obtains information regarding a WiFi point and signal intensity from the received WiFi signal, and compares the same with the stored information regarding the WiFi signal at the user's seat. Specifically, if the received WiFi point and signal intensity is consistent with the stored WiFi point and signal intensity average to a certain extent, the electronic apparatus 201 recognizes the current position as a user seat (S609).

If it is determined that the current position is the user's seat, the electronic apparatus 201 does not perform an operation to detect a meeting.

Figure 7A:
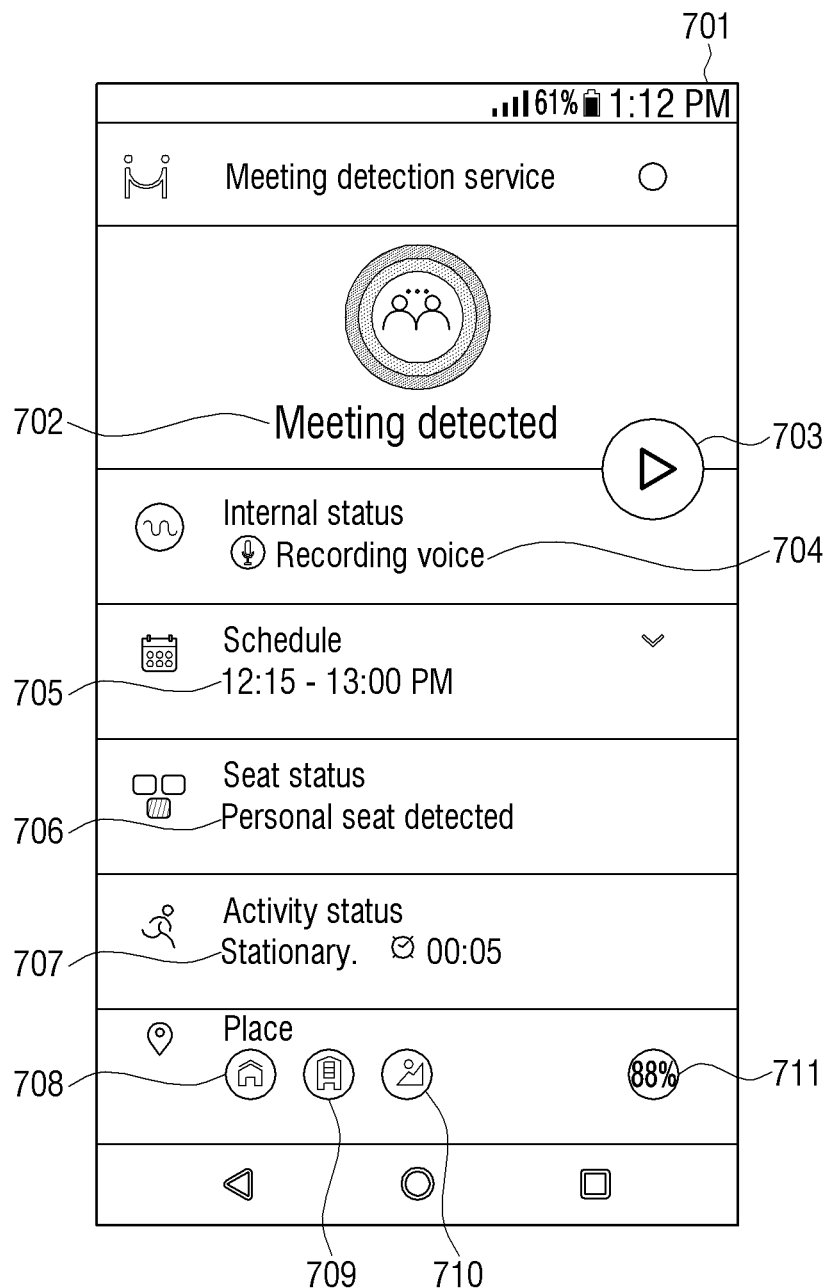
FIGS. 7A and 7B are views illustrating a User Interface (UI) screen which is displayed on a display of an electronic apparatus according to an exemplary embodiment.
Figure 7B:
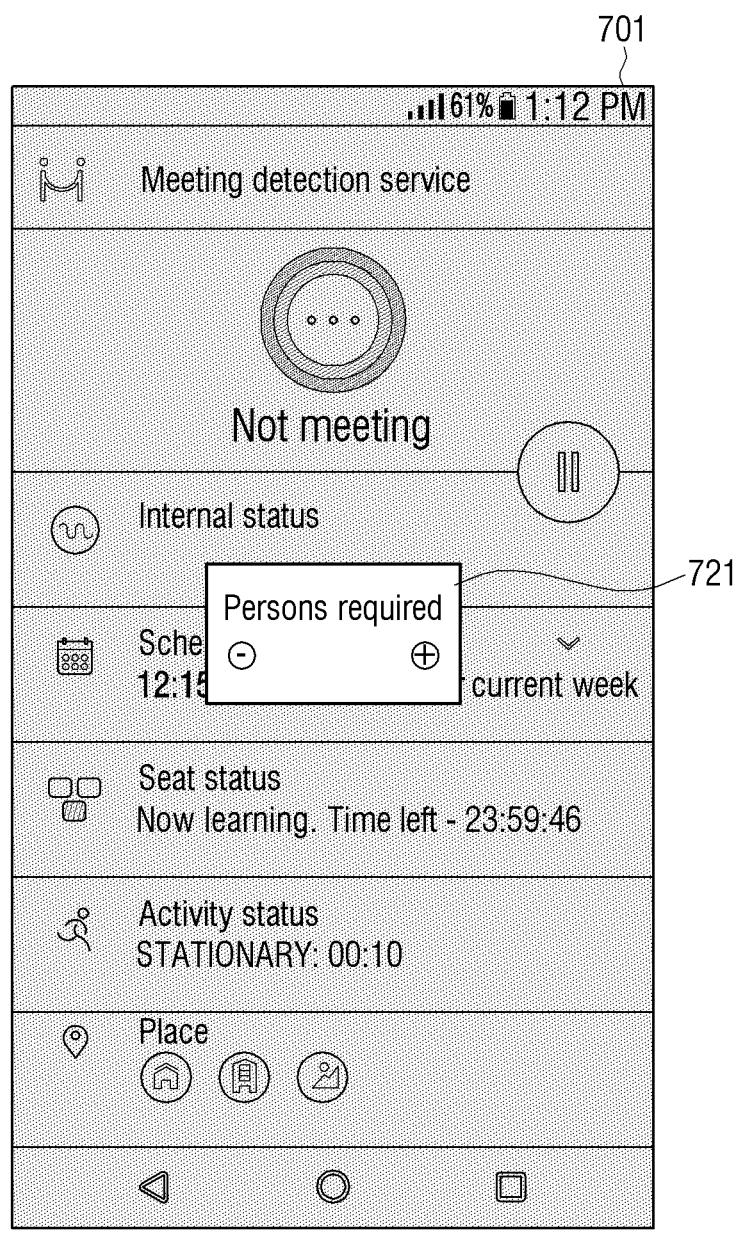

FIGS. 7A and 7B are views illustrating a User Interface (UI) screen which is displayed on the display 260 of the electronic apparatus 201 according to an exemplary embodiment.

FIG. 7A illustrates a UI screen 701 which indicates a situation to detect a meeting. The UI screen 701 may display a message 702 to inform whether there is a meeting, a button 703 to play or stop a recorded voice, a message 704 to inform a recording situation, a meeting schedule 705 which is stored in a calendar APP, first location information 706, situation detection information 707, second location information 708, 709, 710, and accuracy 711 regarding meeting detection.

The message 704 may be displayed when the electronic apparatus performs recording to detect a meeting. The meeting schedule 705 may be a schedule which is set on a calendar APP, and may be displayed when there is a scheduled meeting. The first location information 706 may be a location within a building, in which it is difficult to receive a GPS signal. The first location information 706 may be determined based on a near-field communication network such as WiFi. If the WiFi information which is pre-stored by a user at a specific location is consistent with the WiFi information which is measured at the present time, the electronic apparatus 201 may recognize the present location as the user's seat.

If the electronic apparatus 201 is maintained without any movement for a predetermined time, the electronic apparatus 201 may display the message 704 and the duration 707 on the screen. The electronic apparatus 201 may determine whether to record voices to detect a meeting based on the current status of the electronic apparatus and the first location information.

The second location information 708, 709, 710 may be determined based on a signal received from GPS and log data collected by the electronic apparatus 201. The second location information may be divided into a house 708, an office 709, and another place 710 and displayed.

The accuracy 711 regarding meeting detection may be displayed in the form of probability.

FIG. 7B illustrates a UI element 721 where the number of speakers to detect a meeting can be input. The electronic apparatus 201 may determine whether there is a meeting from recorded voice data based on the number of speakers which is input through the UI element 721. The electronic apparatus 201 analyzes the number of speakers which is input through the UI element 721 and the recorded voice data, and compare the same with the number of identified speakers to determine whether there is a meeting. For example, whenever a user touches '+' or '-' button of the UI element 721 displayed on the screen, the number of speakers may increase or decrease. If the input number of speakers is '2' and the number of speakers which is detected by analyzing recorded voice data is '2', the electronic apparatus 201 may determine that there is a meeting.

Figure 8:
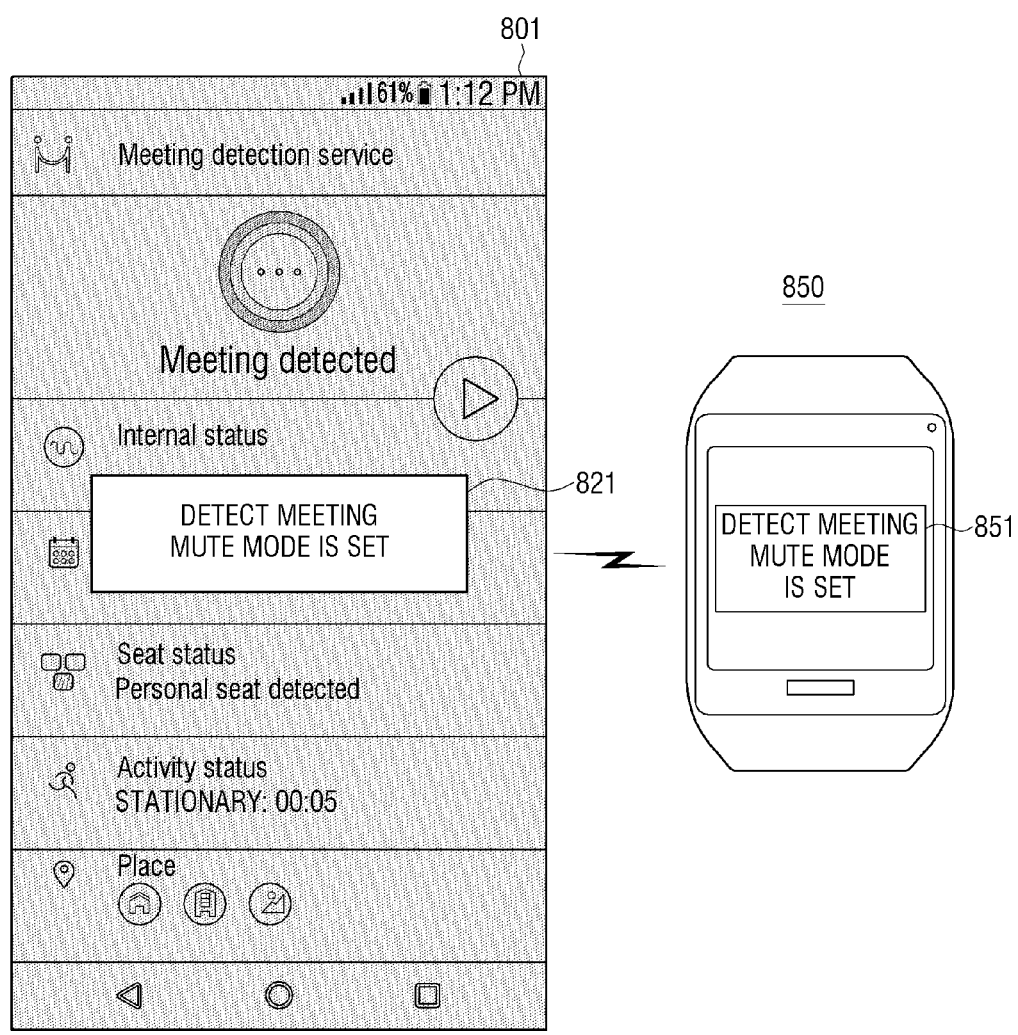
FIGS. 8 to 10 are views illustrating providing a service related to a detected meeting according to an exemplary embodiment.
Figure 9:
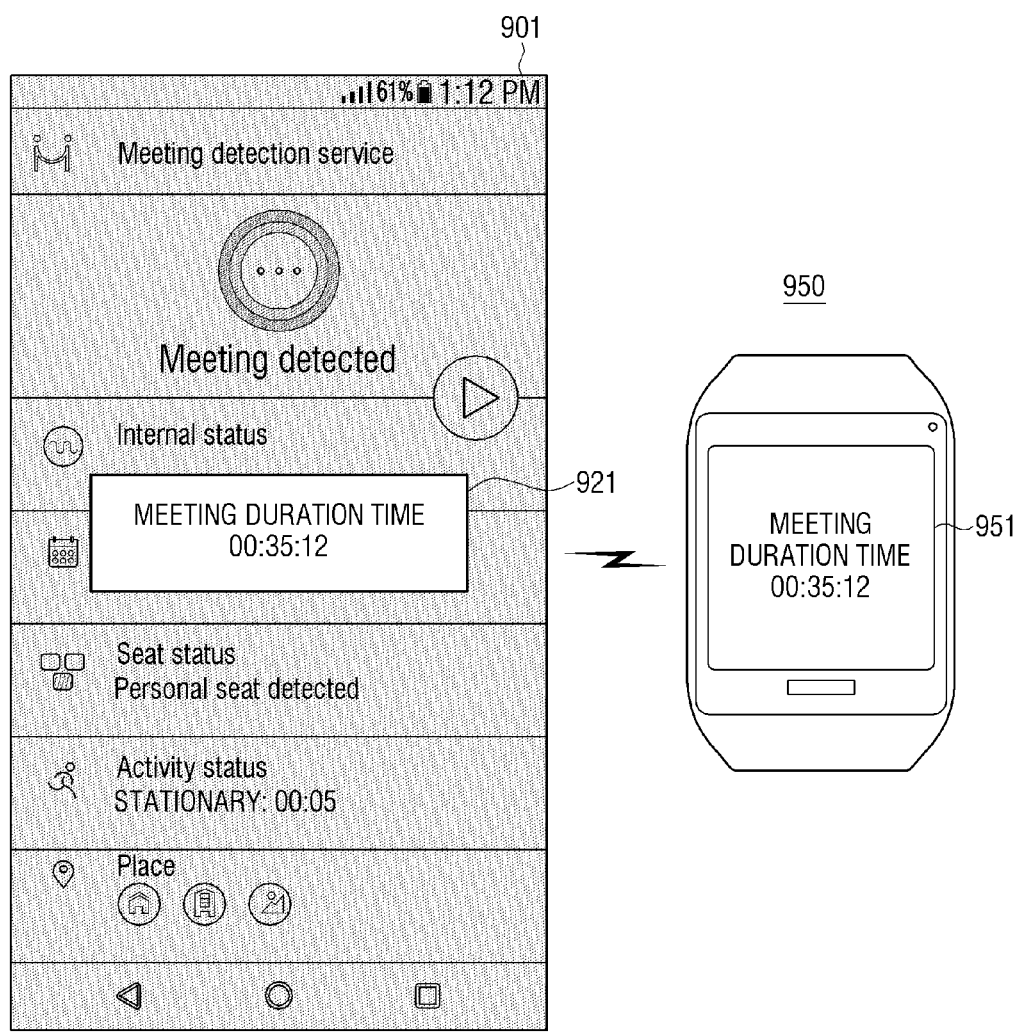
Figure 10:
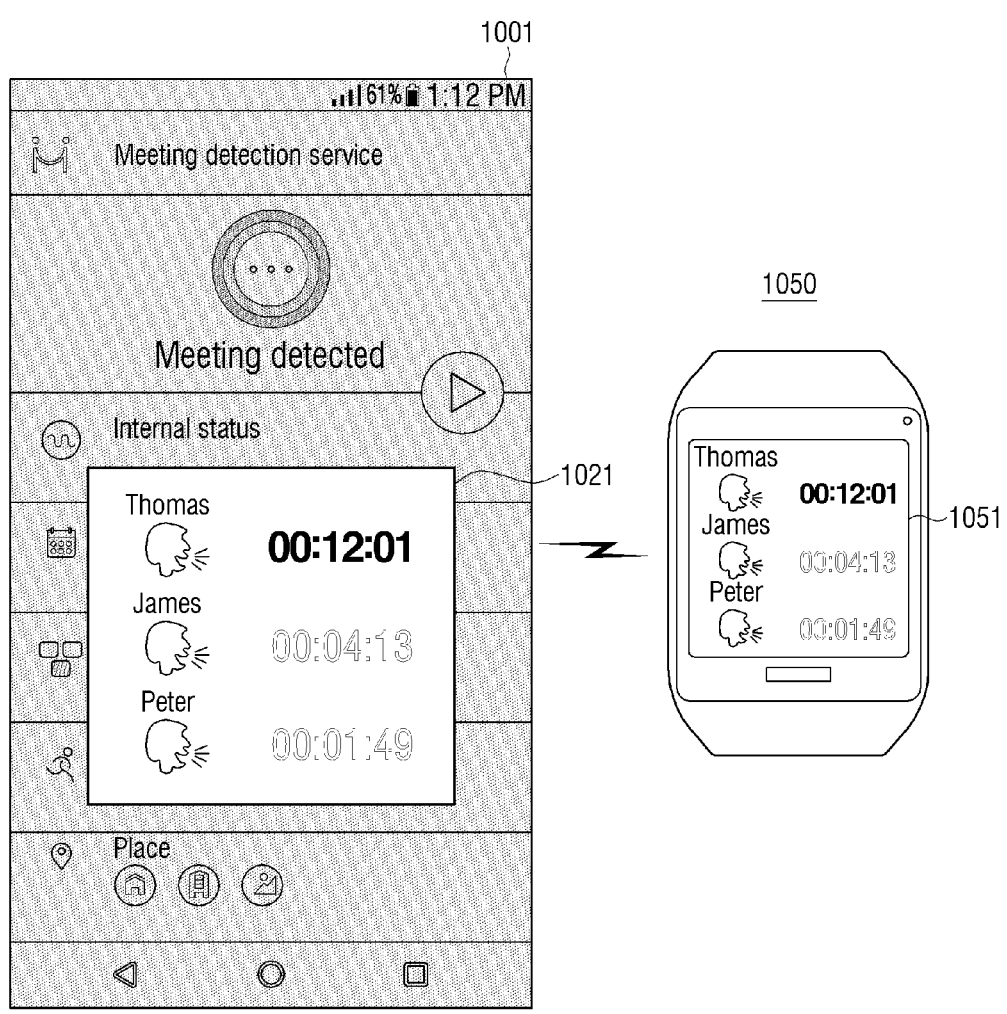

FIGS. 8 to 10 are views provided to explain an example of displaying a notification message on an electronic apparatus and a wearable apparatus when the electronic apparatus detects a meeting.

When a meeting is detected, the electronic apparatus 201 may provide a user with a service which can be performed in a meeting mode and transmit a corresponding notification message to the wearable apparatus. The service may be set by a user or may be provided without a user setting. The notification message may be transmitted to the connected wearable apparatus according to a user setting or regardless of a user setting.

For example, if a message is received from outside while a meeting is detected, the electronic apparatus 201 may transmit the message to the wearable apparatus. If a telephone call is received while a meeting is detected, the electronic apparatus 201 may transmit a message informing a user about the telephone call to the wearable apparatus or connect the telephone call such that the telephone call can be made through the wearable apparatus. In addition, if a telephone call is received while a meeting is detected, the electronic apparatus 201 may transmit a message indicating that an automatic response message has been transmitted to a sender to the wearable apparatus. If an event occurs in the electronic apparatus 201 while a meeting is detected, the electronic apparatus 201 may control to display notification information through a pop-up in the wearable apparatus or to flicker or vibrate a lamp of the wearable apparatus.

FIG. 8 illustrates a screen 801 of the electronic apparatus 201 and a wearable apparatus 850 which is connected to the electronic apparatus. When the electronic apparatus 201 detects a meeting, a message 821 regarding the detection of the meeting is displayed on the screen 801 of the electronic apparatus 201 and a meeting-related service may be provided. The service may be set by a user in advance. In addition, the electronic apparatus 201 may transmit a message regarding the detection of the meeting to the wearable apparatus 850. Accordingly, the message 851 regarding the detection of the meeting may be displayed on the wearable apparatus 850.

For example, if a user sets a "mute mode" as a service to be provided when a meeting is detected, the electronic apparatus 201 may display the message of "a meeting is detected" and the message of "the mute mode is set" on the screen 801 when a meeting is detected. In addition, the electronic apparatus 201 may transmit a notification message to the wearable apparatus 850 when a meeting is detected. The wearable apparatus 850 may display the notification message 851 which is transmitted from the electronic apparatus 201 on the screen.

FIG. 9 illustrates a screen 901 of the electronic apparatus 201 and a wearable apparatus 950. When the electronic apparatus 201 detects a meeting, a duration 921 of the meeting may be displayed on the screen 901 of the electronic apparatus 201. In addition, the electronic apparatus 201 may transmit data regarding the meeting duration to the connected wearable apparatus 950, and the wearable apparatus 950 may display the meeting duration 921 on the screen. The electronic apparatus 201 may transmit to the connected wearable apparatus 950 only the data which indicates that the meeting is started and subsequently, the wearable apparatus 950 may count and display the meeting duration on the wearable apparatus 950.

FIG. 10 illustrates a screen 1001 of the electronic apparatus 201 and a wearable apparatus 1050. The speaking time of each speaker may be displayed on the screen 1001 of the electronic apparatus 201 and the screen of the wearable apparatus 1050.

If a meeting is detected, the electronic apparatus 201 may identify who is speaking in the meeting and measure the speaking time of each speaker. The speaking time 1021 of each speaker may be displayed on the screen 1001 of the electronic apparatus 201, and the electronic apparatus 201 may transmit data regarding the speaking time of each speaker to the wearable apparatus 1050 and the wearable apparatus 1050 may display the speaking time of each speaker on a screen 1051.

For example, the screen of the wearable apparatus 1050 may display that the speakers of the meeting are 'Thomas', 'James' and 'Peter', and the speaking times are '12 minutes and 1 second', '4 minutes and 13 seconds' and 1 minute and 49 seconds', respectively.

Figure 11:
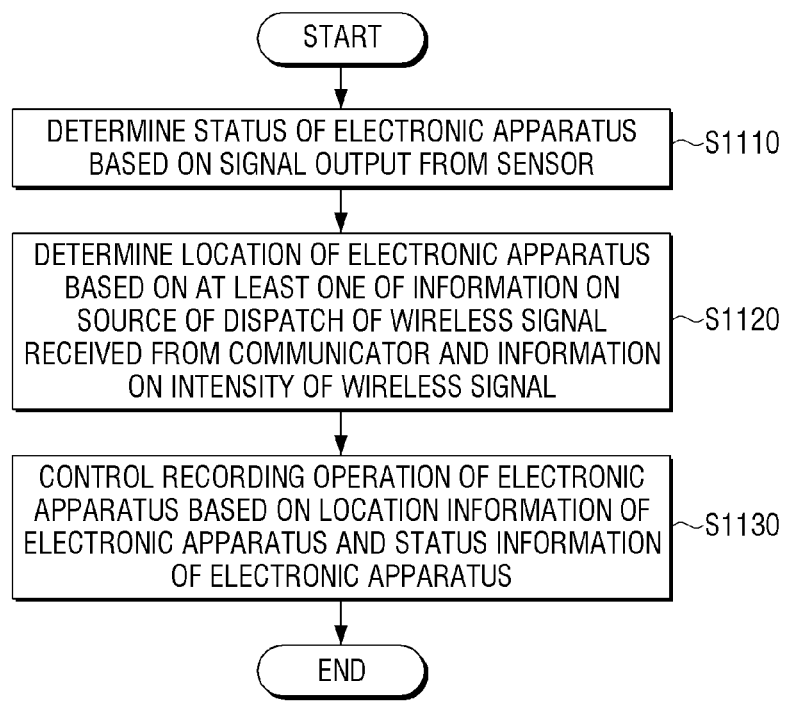
FIG. 11 is a flowchart illustrating a method of controlling recording of an electronic apparatus according to an exemplary embodiment.

FIG. 11 is a flowchart provided to explain a method of controlling recording of an electronic apparatus according to an exemplary embodiment.

First of all, the electronic apparatus 10 determines the status of the electronic apparatus 10 based on a signal output from a sensor (S1110). For example, the electronic apparatus 10 may determine the dynamic movement status of the electronic apparatus 10 based on a signal output by an acceleration sensor.

The electronic apparatus 10 determines the location of the electronic apparatus 10 based on at least one among sender information and intensity information of a wireless signal which is received from a communicator (S1120). For example, the electronic apparatus 10 may determine the location of the electronic apparatus 10 based on the sender information and intensity information with respect to connected WiFi.

The electronic apparatus 10 controls the recording operation of the electronic apparatus 10 based on the location information of the electronic apparatus 10 and the status information of the electronic apparatus 10 (S1130). Specifically, the electronic apparatus 10 may determine whether a meeting is currently taking place based on the location information and status information of the electronic apparatus 10, and if it is determined that there is a meeting, may perform the recording operation and if not, may not perform the recording operation. In addition, if it is determined that there is a meeting, the electronic apparatus 10 may provide a meeting-related service (a mute service, a vibration service, etc.).

According to the above-described various exemplary embodiments, the electronic apparatus 10 may detect a meeting automatically and provide a user with a meeting-related service (for example, an automatic recording service, a mute service, a vibration service, etc.) without a user manipulation or an apparatus (for example, a chair where a pressure sensor is attached, etc.).

Although exemplary embodiments have been shown and described, it will be appreciated by those skilled in the art that changes may be made to these exemplary embodiments without departing from the principles and spirit of the present disclosure. The operations according to an exemplary embodiment may be realized by a single process. In this case, in order to perform the operations which are realized by various computers, a program command may be recorded in a computer readable recording medium which may include a program command, a data file, a data structure, etc. along or in combination. The program command may be designed and configured specifically for the present disclosure or may be known to and usable by those skilled in the art. The examples of the computer readable recording medium include a hardware apparatus which is configured to store and perform magnetic media including hard disk, floppy disk and magnetic tape, optical media including CD-ROM or DVD, magnetic-optical media including floptical disk, program command including ROM, RAM, flash memory, etc. The examples of the program command include not only a mechanic language code which is made by a compiler but also a high-level language code which can be executed by a computer using an interpreter, etc. In case where all or part of a base station or a relay described in an exemplary embodiment is realized as a computer program, a computer readable recording medium which stores the computer program is also included in the present disclosure. Accordingly, the scope of the present disclosure shall not be limited to the above-described exemplary embodiments, and shall be defined in the appended claims and their equivalents.

What is claimed is:

1. An electronic apparatus, comprising:
   a sensor configured to sense a movement of the electronic apparatus;
   a communicator configured to receive a wireless signal;
   a microphone configured to convert a sound to an electrical signal; and
   a processor configured to determine the movement of the electronic apparatus based on a signal output from the sensor, determine a location of the electronic apparatus based on a source of the wireless signal, and control a recording operation of enabling the microphone based on the determined location of the electronic apparatus and the movement of the electronic apparatus.

2. The electronic apparatus as claimed in claim 1, wherein the location of the electronic apparatus is determined based on an intensity of the wireless signal.

3. The electronic apparatus as claimed in claim 1, wherein the processor is further configured to control the recording operation to intermittently record.

4. The electronic apparatus as claimed in claim 3, wherein the processor is further configured to control the recording operation for a first time period, process recorded voice data for a second time period, and pause recording for a third time period.

5. The electronic apparatus as claimed in claim 1, wherein the processor is further configured to generate recorded voice data based on the electrical signal, determine a number of speakers based on the recorded voice data, and in response to the number of speakers being greater than n (n is a natural number), set the electronic apparatus to a meeting mode.

6. The electronic apparatus as claimed in claim 5, wherein the processor is further configured to, in response to the determined number of speakers being smaller than n (n is a natural number), pause the recording operation for a predetermined time, and resume the recording operation again after the predetermined time elapses.

7. The electronic apparatus as claimed in claim 5, further comprising:
   a display configured to display a screen,
   wherein the processor is further configured to control the display to display a UI screen indicating the meeting mode.

8. The electronic apparatus as claimed in claim 5, wherein the meeting mode is a vibration mode.

9. The electronic apparatus as claimed in claim 5, wherein the meeting mode is a silent mode.

10. The electronic apparatus as claimed in claim 5, wherein the processor is further configured to, in response to receiving a call from a caller while operating in the meeting mode, control the communicator to transmit a preset message to the caller.

11. The electronic apparatus as claimed in claim 5, wherein the processor is further configured to generate a plurality of sub frames by dividing the recorded voice data by a predetermined time interval, extract a plurality of feature values from a sub frame of the plurality of sub frames, and calculate an average and a standard deviation of the plurality of feature values to determine the number of speakers.

12. The electronic apparatus as claimed in claim 5, wherein the processor is further configured to determine intensity information of the wireless signal based on average values of the wireless signal over a period of time.

13. The electronic apparatus as claimed in claim 12, wherein the processor is further configured to determine the intensity information of the wireless signal based on a standard deviation of the average values.

14. The electronic apparatus as claimed in claim 5, wherein the processor is further configured to determine the location of the electronic apparatus based on log data of an application program executed by the electronic apparatus.

15. The electronic apparatus as claimed in claim 5, wherein the processor is further configured to pause the recording operation when the electronic apparatus is at a first location.

16. The electronic apparatus as claimed in claim 5, wherein the processor is further configured to control the recording operation based on time of day information and date information.

17. The electronic apparatus as claimed in claim 16, wherein the time of day information and date information corresponds to a meeting appointment time.

18. A method for controlling recording of an electronic apparatus comprising a sensor and a communicator, the method comprising:
   determining a movement of the electronic apparatus based on a signal output from the sensor;

determining a location of the electronic apparatus based on at least one among a source of a wireless signal received by the communicator; and controlling a recording operation of the electronic apparatus based on the determined location of the electronic apparatus and the movement of the electronic apparatus.

19. The method as claimed in claim 18, wherein the method further comprises:

recording a voice input through a microphone for a first time period to generate recorded voice data;

processing the recorded voice data for a second time period;

determining a number of speakers based on the voice data;

determining whether the number of speakers is greater than n (n is a natural number); and in response to the number of speakers being greater than n, setting the electronic apparatus to a meeting mode.

20. An electronic apparatus comprising:

a plurality of sensors configured to generate a plurality of sense signals;

a communicator configured to communicate with a plurality of external devices and generate a communication signal;

a microphone configured to generate an electrical signal corresponding to a sound; and a processor configured to determine a location of the electronic apparatus based on the plurality of sense signals and the communication signal, intermittently record the electrical signal based on the determined location, determine whether the user is in a meeting based on the recorded electrical signal, and in response to determining the user is in the meeting, set the electronic apparatus to a meeting mode.

* * * * *